United States Patent [19]

Sternberg

[11] 4,351,078
[45] Sep. 28, 1982

[54] DRIVING ARRANGEMENTS FOR FLOOR MAINTENANCE MACHINES

[75] Inventor: Kurt Sternberg, Wuppertal, Fed. Rep. of Germany

[73] Assignee: Vorwerk & Co. Interholding GmbH, Wuppertal, Fed. Rep. of Germany

[21] Appl. No.: 258,754

[22] Filed: Apr. 29, 1981

[30] Foreign Application Priority Data

May 3, 1980 [DE] Fed. Rep. of Germany ....... 3017072

[51] Int. Cl.³ .......................... A47L 5/26; A47L 11/14
[52] U.S. Cl. ..................................... 15/49 C; 15/383;
15/389; 51/176; 173/12
[58] Field of Search .................. 15/49 C, 50 C, 52, 98,
15/383, 389; 51/170 PT, 176; 173/12

[56] References Cited

U.S. PATENT DOCUMENTS 3,639,941 2/1972 Kirwan ................................. 15/389
3,772,727 11/1973 Worwag ............................. 15/49 C

FOREIGN PATENT DOCUMENTS 2067066 7/1981 United Kingdom ............... 15/49 C

Primary Examiner—Edward L. Roberts
Attorney, Agent, or Firm—Michael J. Striker

[57] ABSTRACT

A floor maintenance machine includes a machine housing, a treating tool mounted on the machine housing for positional adjustment toward and away from the surface to be treated as considered in the operative position of the machine, an electric motor having a housing and an output shaft, and a transmission interposed between the output shaft of the motor and the treating tool and operative for transmitting torque therebetween. The motor housing is mounted on the machine housing for angular displacement in a range delimited by abutments on these housings about the axis of the output shaft and carries an eccentrically situated pin which is received in a slot of an adjusting lever which is rigid with a frame on which the treating tool is mounted, so that the tool is lifted when the torque increases and lowered when the torque decreases. A section of the machine housing is transparent and markings provided on the periphery of the motor housing are visible therethrough. A latching member arrests the motor housing in its then assumed position when the torque exceeds a predetermined limit and switches off the supply of electric energy to the motor at the same time, until released by a releasing element. A centrifugally extendable control member on the motor housing abuts a stationary stop on the machine housing when the speed of angular displacement of the motor housing exceeds a predetermined limit.

12 Claims, 2 Drawing Figures

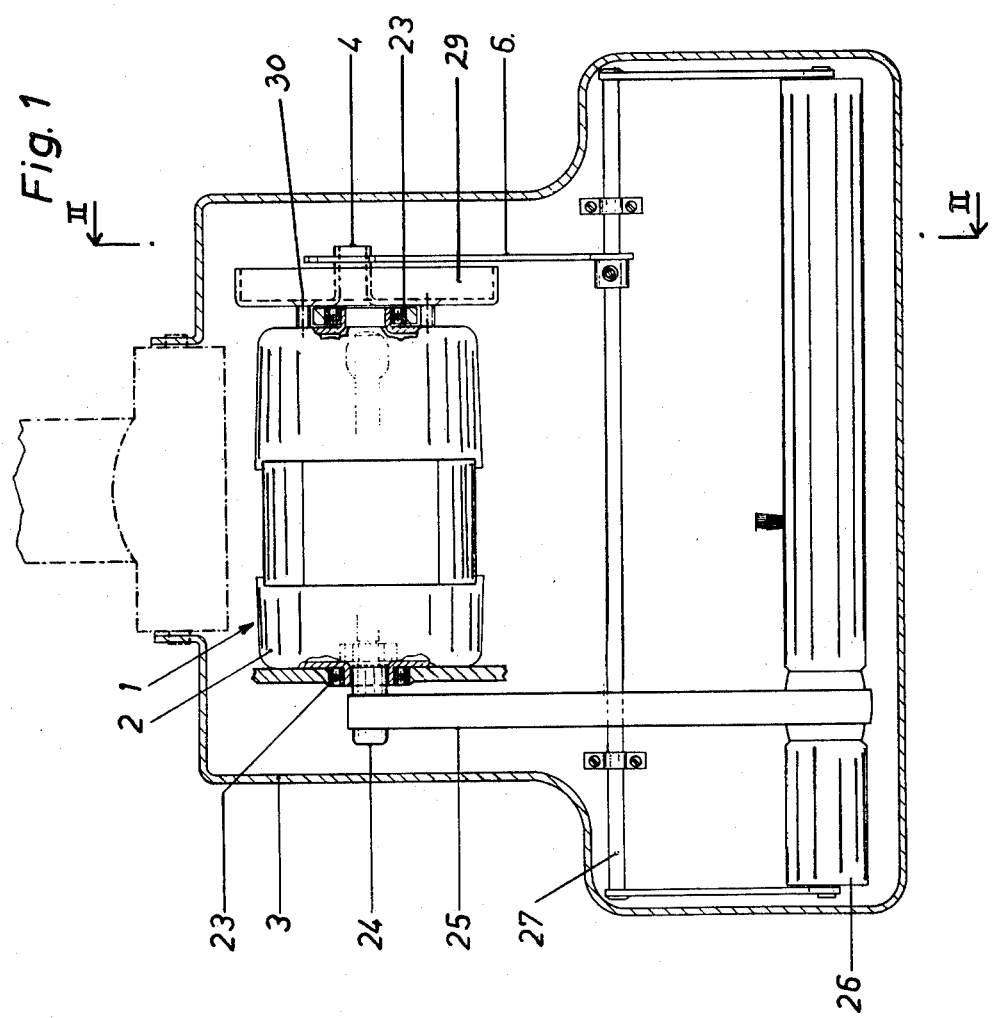

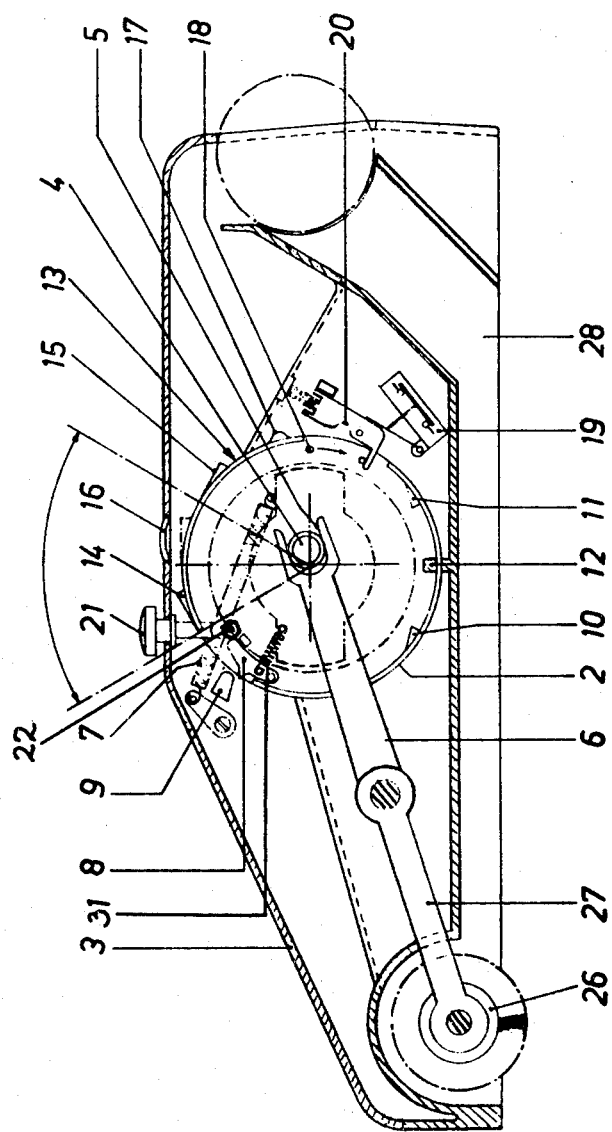

DRIVING ARRANGEMENTS FOR FLOOR MAINTENANCE MACHINES

BACKGROUND OF THE INVENTION

The present invention relates to surface treating machines in general, and more particularly to driving, supervision and control arrangements for floor maintenance machines.

There are already known various constructions of floor maintenance machines, such as sweeping, vacuuming, shampooing or similar machines which are in many instances equipped with tools which contact the surface being treated to loosen or pick up soil or dirt deposited thereon and which are moved by a drive including an electric motor or the like with respect to the machine housing and hence also relative and along the surface being treated or maintained as the machine moves over the same. Some of these conventional machines are even equipped with various devices which allow supervision or control of the operation of the motor or of the tool, such as a torque control device, a tool wear indicating device or a device for terminating the operation of the machine when the tool or the motor has been blocked.

Such devices are particularly useful in machines in which the tool or tools rotate relative to the machine housing, particularly when the tool is a rotatable, especially cylindrical, brush, since then the problems of tool blockage, excessive torque and rapid tool wear are especially pronounced and may go unnoticed, which may result in loss of effectiveness of, or even damage to, the machine. Yet, the heretofore machines of this type are equipped only with some of the above devices, and the devices themselves are rather complex.

SUMMARY OF THE INVENTION

Accordingly, it is a general object of the present invention to avoid the disadvantages of the prior art.

More particularly, it is an object of the invention to provide a floor maintenance machine which is not possessed of the drawbacks of the conventional machines of this type.

Yet another object of the present invention is to so construct the maintenance machine as to be able to control the torque, supervise the degree of wear of the tool, and determine when a blockage has occurred, as well as to achieve automatic termination of the operation of the tool drive in the latter event and to mechanically arrest the drive in a predetermined position.

It is still another object of the invention to so design the various devices which accomplish the above-mentioned control and supervision functions as to be simple in construction, not to unduly increase the complexity and thus the cost of the machine, and yet to give reliable indications of the operating conditions of the operation of the machine and perform reliable control of such operation.

In pursuance of these objects and others which will become apparent hereafter, one feature of the present invention resides, in a machine for treating surfaces, especially in a floor maintenance machine, in a combination which, briefly stated, comprises a machine housing; means for supporting the machine housing in a predetermined position on the respective surface to be treated for displacement along the same; a treating tool; means for mounting the treating tool on the machine housing for treating movement and for positional adjustment toward and away from the respective position as considered in the aforementioned position of the machine housing; means for causing the treating tool to conduct the treating movement, including a motor having an output shaft rotatable about an axis, a motor housing mounted on the machine housing for angular displacement about said axis, and a transmission interposed between the output shaft and the treating tool; and means for adjusting the position of the treating tool relative to the respective surface, including a connecting element so connected to the motor housing as to orbit around said axis in dependence on the extent of the angular displacement of the motor housing during the operation of the machine and operatively connected to the mounting means for the treating tool for adjusting the position thereof.

A particularly simple construction is obtained when the connecting element is a pin rigidly connected to the motor housing at one axial end face thereof, and when the adjusting means includes an adjusting lever pivotally mounted on the machine housing and having an elongated slot receiving the pin. When the adjusting means is constructed in this manner, the orbiting movement of the pin, which accurately corresponds to the angular displacement of the motor housing, is directly translated into the pivoting of the adjusting lever while the pin moves within the slot to compensate for the differences in trajectories. Advantageously, the machine further includes at least one spring which extends between the machine housing or any element rigidly mounted thereon, on the one hand, and the motor housing, on the other hand, and urges the motor housing toward a position of rest which is assumed by the housing when the machine is out of operation. This means that the housing will have a tendency to return to its rest position, and that it will be angularly displaced out of this position only when the torque acting on the motor housing as a result of the electromagnetic forces between the stator and rotor of the electric motor exceeds the product of the force of the spring and the distance of its point of attachment to the motor housing from said axis, and then only to the extent of such excess.

In accordance with a further facet of the present invention, the machine further comprises means for controlling the angular speed of the motor housing, including a control member mounted on the motor housing for outward movement under the influence of centrifugal forces occurring during the angular displacement of the motor housing, particularly a lever pivotable between a retracted and an extended position and urged by a spring toward its retracted position. The controlling means advantageously also includes means for limiting the extent of the angular displacement of the motor housing when the angular speed of the same exceeds a predetermined limit, including a stop rigidly mounted on the machine housing and extending into the path in which the control member or lever travels once the aforementioned limit has been exceeded. This feature of the present invention is particularly useful during the initial phase of operation from the standstill when the motor housing has a tendency to pick up excessive speed and, consequently, would become excessively angularly displaced were it not for the provision of the centrifugally influenced control member or lever and the cooperating stop which extends into the path of travel thereof only when the angular speed is excessive.

In addition thereto, the machine is advantageously also provided with means for limiting the extent of angular displacement of the motor housing independently of the angular speed, that is, only due to the torque acting on the motor housing, this limiting means including at least one abutment member on each of the housings, the abutment member on the machine housing extending into the trajectory of movement of the abutment member on the motor housing to prevent angular displacement of the motor housing beyond its position in which the abutment members contact one another. Particularly when the motor is reversible, it is further advantageous when the limiting means further includes an additional abutment member on one of the housings, particularly on the motor housing, the additional abutment member being angularly spaced about said axis from the abutment member which is provided on the one housing and equidistant therewith from said axis, while the abutment member provided on the other housing is situated intermediate the abutment members provided on the one housing, so that it contacts a different one of the two abutment members of the one housing for each sense of angular displacement of the latter. In this manner, there is obtained a control of the extent to which the torque acting on the motor housing can influence the angular position of the latter.

In some circumstances, like when the degree of tool wear is to be determined, it is advantageous to be able to ascertain the angular position of the motor housing during the operation of the machine and thus the torque to which the motor housing is subjected, which torque will be proportionate to the resistance which the tool encounters during its movement. To achieve this, the machine is equipped, in accordance with a further concept of the present invention, with means for indicating the extent of the angular displacement of the motor housing, including a transparent section on the machine housing through which a strip-shaped portion of the outer periphery can be seen as the motor housing is angularly displaced through its entire range of angular displacement, this strip-shaped portion of the outer periphery of the motor housing being provided with markings which come into registry with the transparent section of the machine housing one after the other as the motor housing is angularly displaced. This constitutes a very simple solution to this problem, and yet the results obtained are reliable.

Sometimes, it may not be sufficient to merely limit the extent of angular displacement of the motor housing in response to excessive torque acting on the housing, but it may be desirable to discontinue the operation of the machine altogether under such circumstances, for instance, when the tool is blocked, in order to prevent damage to the components of the machine which could result from the continued operation thereof. To this end, the machine of the present invention is advantageously equipped with means for deenergizing the motor when the maximum permissible torque has been reached, this deenergizing means including two projections provided on the motor housing for joint angular displacement therewith, an on-off switch for the motor having an actuating part reaching into the path of movement of one of the projections at a point corresponding to the position of the one projection when the maximum permissible torque has been reached and operative for deenergizing the motor when contacted by the one projection, and latching means engaging the other of the projections once the latter has reached its position corresponding to the maximum permissible torque and holding the same in this position until mechanically released. Then, the machine is also equipped with means for releasing the latching means, including an actuating member having a portion accessible at the exterior of the machine housing and operative for causing the other projection and the latching means to perform relative movement from a latching position into a releasing position thereof.

A particular advantage of the present invention resides in the fact that, due to the angularly displaceable mounting of the motor housing, it is possible to achieve all of the above-discussed supervisory and control functions by resorting to relatively simple and inexpensive expedients which only insignificantly, if at all, increase the cost of manufacture of the maintenance machine. Yet, the machine of the present invention surpasses the much more complex conventional machines of this type in the number of supervisory and control functions which it is capable of offering or performing.

The novel features which are considered as characteristic of the invention are set forth in particular in the appended claims. The improved maintenance machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a top plan view of a floor maintenance machine embodying the present invention, wherein the machine housing has been partially broken away to show how the motor is mounted on the machine housing for angular displacement relative thereto; and FIG. 2 is a sectional view of the floor maintenance machine taken on line II—II of FIG. 1 and illustrating the manner in which the angularly displaceable motor housing cooperates with the mounting arrangement for the maintenance tool.

DETAILED DESCRIPTION OF THE PREFERRED EMBODIMENTS

Referring now to the drawing in detail, and first to FIG. 1 thereof, it may be seen that the reference numeral 1 has been used to identify an electric motor having a housing 2. The electric motor 1 is accommodated in a machine housing 3 of the floor maintenance machine according to the present invention, together with a transmission belt 25 and a floor maintenance tool 26 which, in the illustrated machine, is constituted by a cylindrical brush rotatable about an axis transverse to the direction of movement of the maintenance machine on the surface being treated. The electric motor 1 further includes an output shaft 24, and the transmission belt 25 is trained about the output shaft 24 and about a portion of the cylindrical brush 26 to rotate the latter in response to the rotation of the output shaft 24.

The cylindrical brush 26 is mounted on a carrier frame 27 which is pivotally mounted on the machined housing 3 and which can be pivoted by a lever 6 to thereby change the distance between the axis of rotation of the cylindrical brush 26 and the surface to be treated. The motor housing 2 is mounted on the machine housing 3 for angular displacement about an axis coinciding with that of the output shaft 24 of the electric motor 1, by means of bearings 23. A pin 4 is connected to the motor housing 2 for joint angular displacement therewith, for instance, by being mounted on a member 29 which, in turn, is connected to the motor housing 2 by screws 30 or similar fasteners. As shown, the member 29 and the pin 4 are of one piece with one another, having been produced by drawing from a sheet metal blank. The pin 4 is eccentric with respect to the axis about which the motor housing 2 turns, so that it conducts orbiting movement about this axis as the motor housing 2 is angularly displaced during the operation of the motor 1.

As can be seen in FIG. 2, the pin 4 is received in an open slot provided in the free end portion of the adjusting lever 6 which is rigidly connected to the frame 27 which supports the cylindrical brush 26. Thus, as the motor housing 2 turns about its axis in dependence on the magnitude and direction of the torque acting thereon, the pin 4, which shares in the angular displacement of the motor housing 2 but is offset from the axis of the latter, conducts the orbiting movement about this axis as mentioned above and, since it is confined in the slot 5 of the adjusting lever 6, it pivots the frame 27 in the clockwise or counterclockwise direction as considered in FIG. 2, and thus raises or lowers the cylindrical brush 26, depending on the sense of the angular displacement of the motor housing 2. As will be explained later, the motor housing 2 is limited to angular displacement within a limited range as indicated in dash-dotted lines in FIG. 2, these lines intersecting at the axis of the motor housing 2.

The machine housing 3 moves over the surface to be maintained, such as a floor or carpet to be cleaned, and as it does, the cylindrical brush 26 which rotates and contacts this surface, lifts up dirt or other contaminants. These contaminants are removed from the machine via a suction channel 28 which communicates, in a known manner, with a source of subatmospheric pressure which is of a conventional construction and thus has not been shown in the drawing.

As mentioned before, the extent of the angular displacement of the motor housing 2 about its axis relative to the machine housing 3 is limited. This is attributable to the provision of two abutment members 10 and 11 on the housing 2 of the electric motor 1 which share in the angular displacement of the motor housing 2, and a single abutment member 12 stationarily mounted on the machine housing 3 and extending into the trajectory of movement of the abutment members 10 and 11. The abutment member 12 is situated between the abutment members 10 and 11 so that it contacts the abutment member 10 when the motor housing 2 moves sufficiently from its illustrated position in the counterclockwise direction, and the abutment member 11 upon sufficient movement in the clockwise direction, and any further angular displacement of the motor housing 2 is prevented. A spring 7, particularly a helical tension spring, is mounted on the machine housing 3 or on a component mounted on the latter at one of its ends, and is connected to the motor housing 2 at its other end, and urges the motor housing 2 in the counterclockwise direction, that is, toward contact of the abutment members 10 and 12.

The motor housing 2 may further have, as illustrated in FIG. 2, a centrifugally displaceable element 8 urged toward the illustrated position by a spring 31 mounted thereon, and a stop member 9 may be provided on the machine housing 3 at the outside of the path of travel of the element 8 with the motor housing 2 at low angular speeds of the latter, the stop member 9 reaching into the path in which the element 8 travels when the angular speed of the housing 2 is excessive and the element 8 is displaced by centrifugal forces from the retracted position illustrated in FIG. 2 outwardly into its extended position.

The motor housing 2 has an outer periphery 13 on which there are provided visually distinct markings 14 and 15, of which only three are shown but significantly more may be provided, which travel past a transparent section 16 of the machine housing 3 as the motor housing 2 is angularly displaced to be visually perceptible therethrough. A projection 17 is also provided at the outer periphery 13 of the motor housing 2, while another projection 18 is provided on the end face of the motor housing 2. The projection 18 cooperates, once the motor housing 2 has moved excessively in the clockwise direction, with an actuating portion of a latching element 20 which is provided with a recess for accommodating the projection 17 under these circumstances. The latching element 20 cooperates with an actuating part of a switch 19 which is interposed in the power supply line to the electric motor 1 and which interrupts the power supply when so actuated. A releasing element 21 is mounted on the machine housing 3 for displacement along the end face of the motor housing 2 into contact with a screw head, a nut, or a similar protrusion 22 on this end face to displace the same, and with it the entire motor housing 2, in the counterclockwise direction, so that the mechanical holding action of the latching element 20 on the projection 17 which is received in its recess is terminated, so that the motor housing 2 is free to be angularly displaced by the spring 7 in the counterclockwise direction, while the latching element 20 disengages the switch 19 so that the latter reestablishes the supply of electric power to the electric motor.

Having so discussed the construction of the floor maintenance machine embodying the present invention as illustrated in the drawing, the operation of such machine under different operating conditions will now be explained.

It will be appreciated that during steady state operation of the machine the torque applied to the motor housing 2 has the same magnitude as the torque applied to the output shaft 24 but will act in the opposite direction. The torque applied to the output shaft 24, in turn, equals the torque acting on the cylindrical brush 26 increased by the losses in the transmission and bearings. Then, the torque acting on the cylindrical brush 26 is equal to the frictional resistance force opposing the rotation of the cylindrical brush 26 due to the contact of the latter with the surface being treated, times the moment arm of this resistance force. Now, for a given friction force at the brush 26, there is obtained a certain torque at the motor housing 2 which angularly displaces the motor housing 2, which is acted upon by the spring 7, either in the clockwise or in the counterclockwise direction, depending on the magnitude of the friction force as compared to its previous magnitude. This angular displacement of the motor housing 2, in turn, results in clockwise or counterclockwise pivoting of the lever 6 and of the frame 27 and thus in lifting or lowering of the brush 26 relative to the surface being treated so that the friction force is reduced or increased until a new steady state situation is established. Of course, in reality, the friction coefficient between the bristles of the brush 26 and the surface being treated will vary from place to place, either gradually or abruptly, independently of the distance between the axis of the brush 26 and the surface being treated, so that equilibrium situation may never occur; rather, the distance between the axis of rotation of the brush 26 and the surface being treated, and the angular position of the motor housing 2, will gradually vary once a quasi-equilibrium or steady-state situation is achieved in dependence on the frictional force which, in turn, is determined by two variables, that is, the pressure between the bristles of the brush 26 and the surface being treated, and the instantaneous coefficient of friction. In any event, since the increase in the torque acting on the motor housing 2 results in the raising of the brush 26 which, in turn, results in the decrease of the torque and attendant lowering of the brush 26 and so on, the torque acting on the motor housing 2 in a quasi-equilibrium situation is being kept within relatively narrow bounds.

If the cylindrical brush 26 is worn out to such an extent that it does not reach the surface to be treated, or just barely contacts the same without subjecting the same to the desired vigorous action, the resistance force which the surface being treated offers to the rotation of the brush 26 is low or nil even when the brush 26 is in its lowermost position, and the torque acting on the motor housing 2 is low or insignificant, so that the spring 7 displaces the motor housing 2 into, or keeps the latter in, a position in which the marking 15 is visible through the transparent section 16 of the machine housing 3. The appearance of the marking 15 in the transparent section 16 gives an indication to the operating personnel that the worn-out brush 26 is to be replaced by a new one.

During the running-in operation of the machine, which commences with the motor 1 and the brush 26, as well as the transmission belt 25, being at a standstill and terminates a short time thereafter with the above components 1, 26 and 25 being in motion, the torque acting on the motor housing 2 is extremely high, which is at least partially attributable to the fact that the brush 26 is in its lowermost position and the reaction force to be overcome is determined by the static coefficient of friction. As a consequence of this, once the motor 1 is energized, the housing 2 thereof is suddenly angularly displaced in the clockwise direction, which could cause damage to some components of the machine or, as will be discussed below, result in deenergization of the motor 1 immediately after its initial energization. To avoid this possibility, the control member or lever 8 which is mounted on the motor housing 2 for displacement relative thereto between the inwardly retracted and the outwardly extended positions and which is biased by the spring 31 toward its retracted position responds to the considerable centrifugal forces which act thereon during the sudden angular displacement of the motor housing 2 by moving into its extended position in which it abuts the stationary stop 9 provided on the machine housing 3 and thus prevents any further angular displacement of the motor housing 2 beyond this position. Of course, once the static friction is overcome and the components 24, 25 and 26 start to move, the torque subsides rapidly and, since the brush 26 has been lifted during the sudden movement of the motor housing 2 to a certain extent, the torque acting on the motor housing 2 drops below the value needed for holding the latter in the abovementioned position, so that the control member or lever 8 becomes disengaged from the stop 9 and is returned by the spring 31 into its retracted position. Then, the positions of the motor housing 2 and of the frame 27 carrying the brush 26 change in the above-discussed manner until they assume their quasi-equilibrium positions or oscillate only within the relatively narrow bounds about such positions. This situation is shown in FIG. 2.

The operation and cooperation of the components 17 to 22 is as follows: when the torque acting on the motor housing 2 increases, in a gradual manner which does not trigger the operation of the control member 8, to or above the maximum permissible value, the projection 18 engages the latching member 20 and turns the same in the counterclockwise direction until the projection 17 is safely received in the recess provided therefor in the latching member 20. Simultaneously, the latching member 20 actuates the switch 19 so that the latter interrupts the supply of electric energy to the electric motor 1. This would ordinarily result in return movement of the motor housing 2 in the counterclockwise direction, were it not for the fact that the projection 17 is now held in the recess of the latching member 20 and that the force of the spring 7 in the tangential or circumferential direction of the outer periphery 13 of the motor housing 2 and any other forces acting on the latter in this position are to small to release the engagement of the latching member 20 with the projections 17 and 18. Thus, the latching member 20 holds the motor housing 2 in this position and the switch 19 in its disconnecting position until the releasing element 21 has been actuated, usually after the cause of the inordinate torque increase, such as blockage of the brush 26, has been eliminated. When the releasing element 21 is actuated, it applies a force having at least a component in the circumferential direction of the motor housing 2 to the latter via the protrusion 22 in such a manner that this force component moves the motor housing in the counterclockwise direction, thus causing the latching member 20 to turn in the clockwise direction until the projection 17 leaves the recess in the latching element 20 and the motor housing 2 is free to move in the counterclockwise direction. The latching element or member 20 continues its movement until it permits the switch 19 to reestablish the supply of electric power to the electric motor 1. While the motor housing 2 is being held in the aforementioned position by the latching member 20, the marking 14 is in registry with the transparent section 16 of the machine housing 3 to be visible therethrough as an indication of the fact that the motor housing 2 is being held in this position. At least one additional marking may be provided on the outer periphery 13 of the motor housing 2, whose appearance in the transparent section 16 is an indication of the proper operation of the machine.

It will be understood that each of the elements described above, or two or more together, may also find a useful application in other types of arrangements differing from the type described above.

While the invention has been illustrated and described as embodied in a floor maintenance machine, it is not intended to be limited to the details shown, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. In a machine for treating surfaces, especially in a floor maintenance machine, a combination comprising a machine housing; means for supporting said machine housing in a predetermined position on the respective surface to be treated for displacement along the same; a treating tool; means for mounting said treating tool on said machine housing for treating movement and for positional adjustment toward and away from the respective surface as considered in said position of said machine housing; means for causing said treating tool to conduct said treating movement, including a motor having an output shaft rotatable about an axis, a motor housing mounted on said machine housing for angular displacement about said axis, and a transmission interposed between said output shaft and said treating tool; and means for adjusting the position of said treating tool relative to the respective surface, including a connecting element so connected to said motor housing as to orbit around said axis in dependence on the extent of said angular displacement of said motor housing during the operation of the machine and operatively connected to said mounting means for said treating tool for adjusting the position thereof.

2. The combination as defined in claim 1, wherein said connecting element is a pin rigidly connected to said motor housing at one axial end face of the latter.

3. The combination as defined in claim 2, wherein said adjusting means includes an adjusting lever having an elongated slot; and wherein said pin is received in said slot.

4. The combination as defined in claim 1; and further comprising means for urging said motor housing toward a rest position assumed when the machine is out of operation, including at least one spring.

5. The combination as defined in claim 1; and further comprising means for controlling the angular speed of said motor housing, including a control member mounted on said motor housing for outward movement under the influence of centrifugal forces occurring during the angular displacement of said motor housing.

6. The combination as defined in claim 5, wherein said control member is a lever mounted on said motor housing for pivoting between a retracted and an extended position; and wherein said controlling means further includes a spring urging said lever toward said retracted position thereof.

7. The combination as defined in claim 5, wherein said controlling means further includes means for limiting the extent of said angular displacement of said motor housing when the angular speed of the latter exceeds a predetermined limit, including a stop rigidly mounted on said machine housing and extending into the path in which said control member travels once said limit has been exceeded.

8. The combination as defined in claim 1; and further comprising means for limiting the extent of said angular displacement of said motor housing, including at least one abutment member on each of said housings, the abutment member on said machine housing extending into the trajectory of movement of the abutment member on said motor housing to prevent angular displacement of said motor housing beyond the position in which said abutment members contact one another.

9. The combination as defined in claim 8, wherein said limiting means further includes an additional abutment member on one of said housings angularly spaced about said axis from said abutment member on said one housing and equidistant from said axis; and wherein said abutment member of the other housing is situated intermediate said abutment members of said one housing to contact a different one of the same for each sense of angular displacement of said motor housing.

10. The combination as defined in claim 1; and further comprising means for indicating the extent of said angular displacement of said motor housing, including a transparent section of said machine housing through which a portion of the outer periphery of said motor housing is visible, and a plurality of visually distinct markings provided on said portion of said outer periphery for angular displacement with said motor housing into registry with said transparent section of said machine housing.

11. The combination as defined in claim 1; and further comprising means for deenergizing said motor when maximum permissible torque has been reached, comprising two projections provided on said motor housing for joint angular displacement therewith, an on-off switch for said motor having an actuating part reaching into the path of movement of one of said projections at a point corresponding to the position of said one projection when said maximum permissible torque has been reached and operative for deenergizing said motor when contacted by said one projection, and latching means engaging the other of said projections once the latter has reached its position corresponding to said maximum permissible torque and holding the same in this position until mechanically released.

12. The combination as defined in claim 11, and further comprising means for releasing said latching means, including an actuating member having a portion accessible at the exterior of said machine housing and operative for causing said other projection and said latching means to perform relative movement from a latching position into a releasing position thereof.

* * * * *